US007034324B2

(12) United States Patent
Voser

(10) Patent No.: US 7,034,324 B2

(45) Date of Patent: Apr. 25, 2006

(54) APPARATUS FOR SENSING OPTICAL CHARACTERISTICS OF A BANKNOTE

(75) Inventor: Christian Voser, Satigny (CH)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 10/320,159

(22) Filed: Dec. 16, 2002

(65) Prior Publication Data

US 2003/0116728 A1 Jun. 26, 2003

(30) Foreign Application Priority Data

Dec. 20, 2001 (EP) ................................ 01310680

(51) Int. Cl.
*G06K 11/00* (2006.01)
*G06K 5/00* (2006.01)

(52) U.S. Cl. ................ 250/556; 250/559.16; 382/135; 356/71

(58) Field of Classification Search ................ 250/556, 250/559.16; 382/135; 356/71; 209/534; 902/7
See application file for complete search history.

(56) References Cited

U.S. PATENT DOCUMENTS 4,980,569 A * 12/1990 Crane et al. ................ 250/556
5,139,339 A * 8/1992 Courtney et al. ........... 356/446
5,434,427 A * 7/1995 Crane et al. ................ 250/556
6,061,121 A * 5/2000 Holl et al. ..................... 356/71
6,605,819 B1 * 8/2003 Ross .......................... 250/556

FOREIGN PATENT DOCUMENTS

| | | |
|---|---|---|
| DE | 100 05 514 A1 | 8/2001 |
| EP | 0 537 513 A1 | 4/1993 |
| EP | 0 718 809 A2 | 6/1996 |
| GB | 894570 | 4/1962 |

* cited by examiner

*Primary Examiner*—Stephone B. Allen
*Assistant Examiner*—Patrick J. Lee
(74) *Attorney, Agent, or Firm*—Fish & Richardson P.C.

(57) ABSTRACT

The optical characteristics of a banknote are measured by using first and second sets of optical devices positioned on respective sides of the banknote path. Each device includes a transmitter and an adjacent pair of receivers, the receivers being capable of receiving light from the adjacent transmitter which has been diffusively reflected by the banknote, and each receiver also receiving light from the transmitter of the opposed device. Calibration is carried out by moving a reference body of predetermined reflectance and transmittance characteristics into the banknote path between the devices.

16 Claims, 6 Drawing Sheets

APPARATUS FOR SENSING OPTICAL CHARACTERISTICS OF A BANKNOTE

This invention relates to an apparatus for sensing optical characteristics of a banknote.

Such apparatus is commonly used to determine the authenticity and denomination of banknotes. Often, a banknote is moved along a path past optical transmitters and receivers so that the transmission or reflection characteristics in respective areas of the banknote can be determined by scanning. The apparatus may include transmitters which operate in multiple wavelengths, such as red, green, blue and infra-red. (It is noted that the terms "optical" and "light" are used herein to refer to any electromagnetic wavelength, and not merely visible wavelengths.)

It would be desirable to provide an apparatus for detecting the optical characteristics of banknotes, which is more compact, less costly, more efficient and/or easier to calibrate than the apparatuses of the prior art.

Aspects of the present invention are set out in the accompanying claims.

In accordance with a further aspect of the invention, a receiver is arranged to receive both light transmitted through the banknote and light reflected from the banknote. Accordingly, the reflection and transmission characteristics of the banknote can be measured in a simple and economic manner. Preferably, the receiver is located in proximity to a transmitter which transmits the light which is reflected by the banknote to the receiver. Also, the arrangement is preferably such that the receiver receives light which is diffusely reflected by the banknote, because this provides a much more representative measurement of the optical characteristics of the banknote than directly reflected light. For this purpose, the light paths to and from the banknote are preferably arranged to be inclined with respect to the normal to the plane of the banknote. Because the receiver and transmitter are in proximity, and possibly mounted on the same circuit board, it is easier to make the apparatus more compact.

In accordance with another aspect of the invention, a light transmitter and a light receiver are arranged on the same side of the path of a banknote, the receiver being arranged to receive light diffusely reflected by the banknote and travelling in a direction which is substantially opposite to that of the light transmitted by the transmitter. Direct reflection can be avoided by arranging for the light paths to be inclined with respect to the normal to the banknote and for the light incident on the banknote to be collimated so that it does not diverge when considered in at least one plane containing the normal to the banknote.

Preferably, the banknote is moved in a scanning direction relative to the incident light, and the light is collimated so that it does not diverge when considered in a plane containing both the scanning direction and the normal to the plane of the banknote. Preferably, the incident light is arranged to diverge when viewed in a plane which contains the normal to the banknote and which is transverse to the scanning direction, so that a single transmitter can be used to illuminate a relatively wide area of the banknote as the banknote is moved in the scanning direction past the transmitter. Preferably, each transmitter is associated with at least two receivers, which could be mounted on opposite sides of the transmitter (displaced in a direction transverse to both the scanning direction and the direction normal to the plane of the banknote) for receiving light from respective areas of the banknote.

It is known to provide a reference surface within an apparatus for measuring the optical characteristics of banknotes, so as to permit calibration of an arrangement for detecting the reflectance characteristics of banknotes. See, for example, EP-0731737-A. It is also known to provide for a manual calibration operation which involves inserting, instead of a banknote, a sheet of calibration paper of known reflectance and/or transmittance characteristics. This will travel along the banknote path so that the apparatus can be calibrated.

It would, however, be desirable to permit automatic calibration of devices used for measuring the transmittance characteristics of a banknote.

In accordance with a further aspect of the invention, apparatus for measuring the optical characteristics of a banknote includes a reference body and means for moving the body from a first position within the apparatus but out of a banknote path to a second position, possibly within the banknote path, between an optical transmitter and an optical receiver, thereby to permit calibration by measuring the transmission and/or reflection characteristics of the reference body. Preferably, the reference body is used for calibrating the measurement of both transmittance and reflectance characteristics. Preferably, a control means is arranged automatically to move the reference body to the second position in response to particular conditions, for example each time a transaction has been completed using a banknote validator incorporating the apparatus of the invention.

An arrangement embodying the invention will now be described by way of example with reference to the accompanying drawings, in which.

Figure 1:
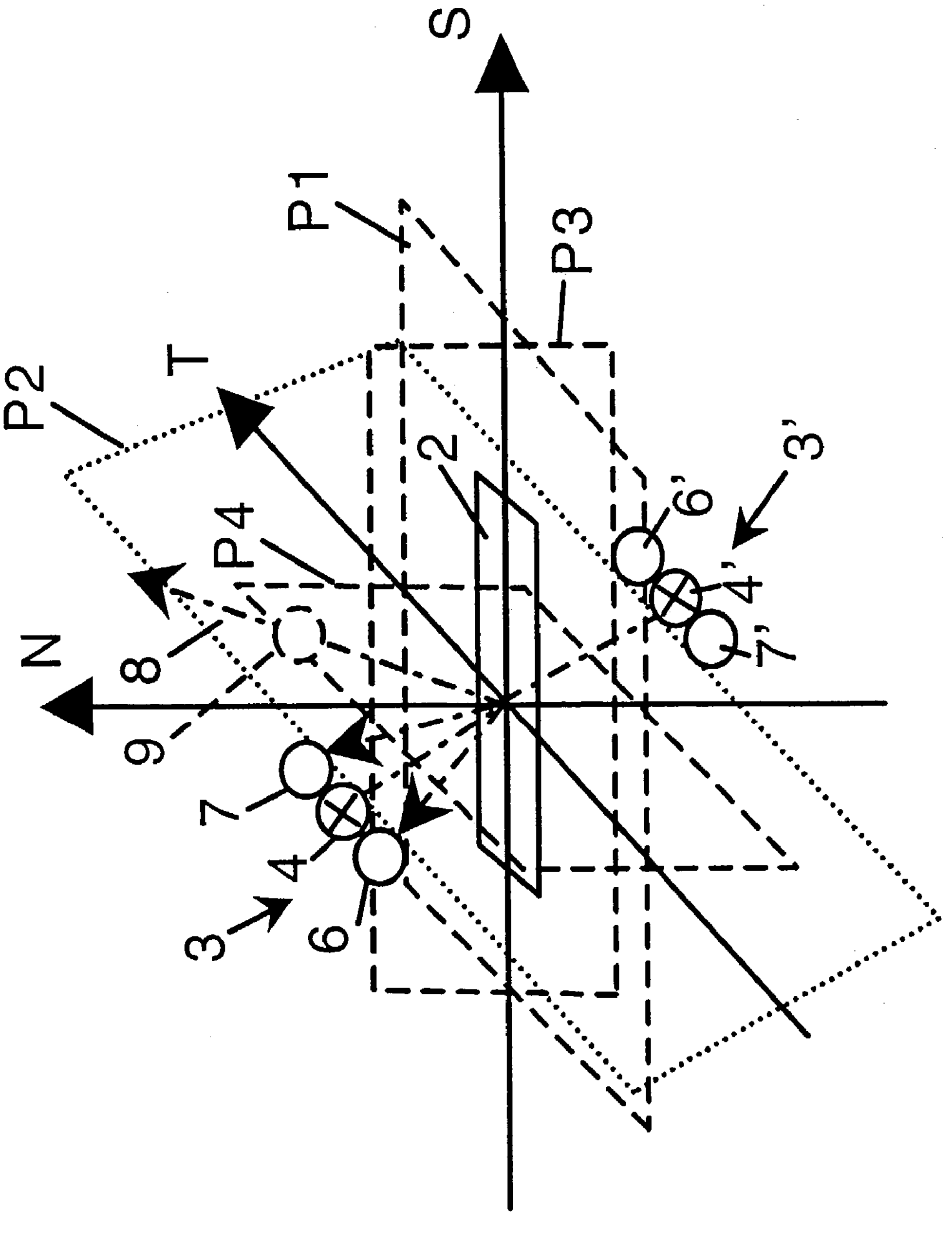
FIG. 1 is a schematic diagram to illustrate some of the principles of operation of an apparatus according to the invention.

Referring to FIG. 1, a banknote 2 lies in a plane P1. In an embodiment of the present invention, drive means are provided for conveying the banknote 2 in a scanning direction S which preferably lies in the plane P1 and more preferably is parallel to the length of the banknote 2. The direction shown at T is transverse, and particularly perpendicular, to the scanning direction S and also lies within the plane P1 of the banknote 2. The direction which is normal to the banknote 2 is shown at N.

The apparatus includes a first optical device 3 including a light transmitter 4 which is arranged to transmit light to the banknote 2 along a path which is parallel to a plane P2. The plane P2 contains the transverse direction T and is located at an angle, for example about 20°, to the normal direction N. The device 3 also includes two light receivers 6, 7 positioned in close proximity to, and on respective sides of, the transmitter 4 and displaced from each other in the transverse direction T.

Any light which is reflected from the banknote back in the direction which is substantially reverse to the direction of the transmitted light will be received by the receivers 6, 7 located near the transmitter 4. This will be diffusely reflected light. Any directly (i.e. specularly) reflected light will travel in a direction 8 away from the transmitter 4 and the receivers 6, 7.

A similar arrangement, involving a device 3' comprising a transmitter 4' and receivers 6', 7', is located diametrically opposite the device 3, on the opposite side of the path of the banknote 2, to measure the reflectance characteristics of the other side (in the drawing the underside) of the banknote. The receivers 6 and 7 are arranged to receive, in addition to light from the transmitter 4 reflected by the banknote, light from the transmitter 4' transmitted through the banknote. Similarly, the receivers 6', 7' can receive light from the transmitter 4 which has been transmitted through the banknote 2. Accordingly, each of the receivers 6, 6', 7, 7' can be used to detect both the reflectance and transmission characteristics of the banknote 2.

Figure 2:
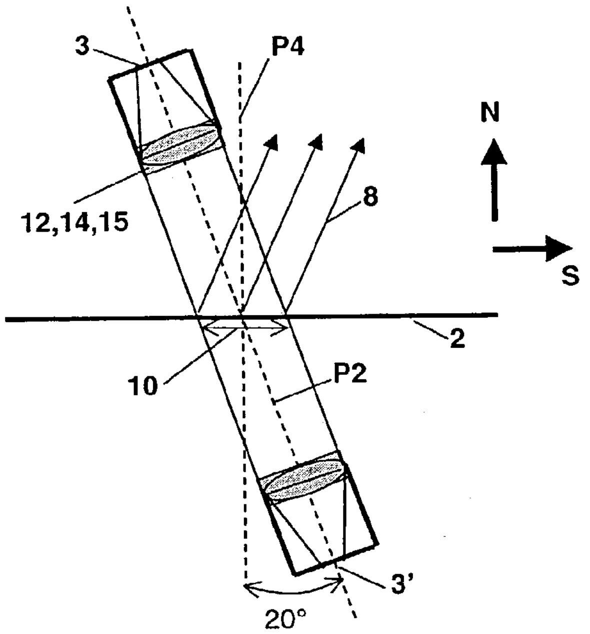
FIG. 2 is a schematic side view showing the operation of devices of the apparatus for measuring transmittance and reflectance characteristics of a banknote.

FIG. 2 is a side view of the devices 3, 3', the plane of the drawing corresponding to a plane P3 (FIG. 1) containing both the scanning direction S and the normal N. The light from the transmitter 4 forms a beam which illuminates an area 10 of the banknote. A lens 12 (see also FIG. 3) collimates the light so that there is substantially no divergence of the beam when viewed in the plane P3. Accordingly, all the directly reflected light travelling in the direction 8 will avoid the receivers 6, 7.

Figure 3:
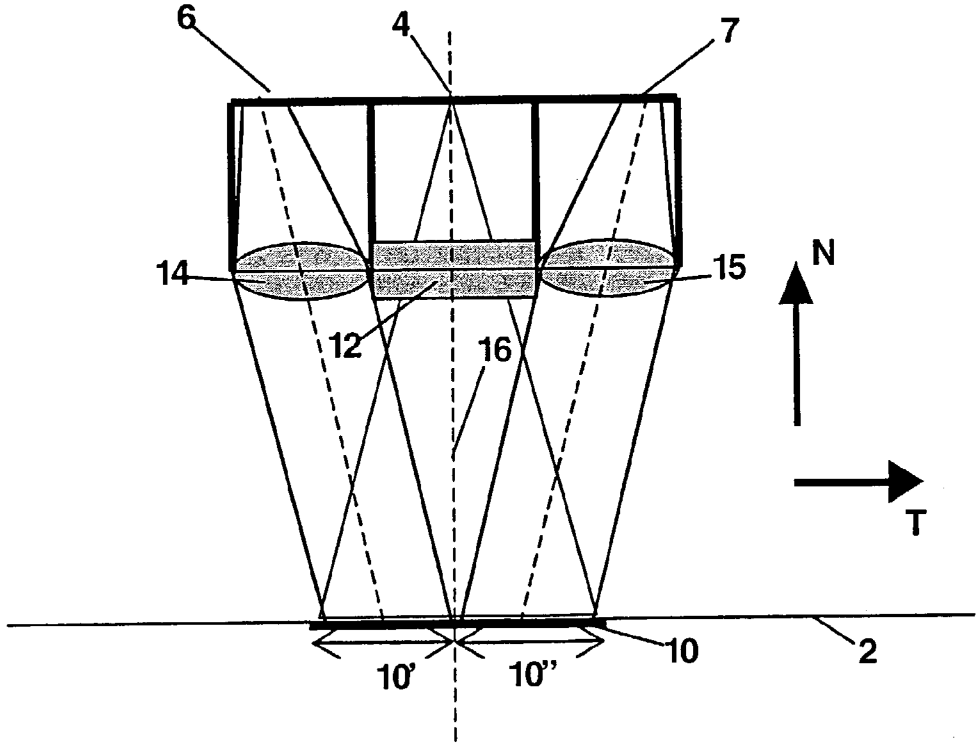
FIG. 3 is a schematic end view of the device of FIG. 2.

In FIG. 3, the plane of the drawing corresponds to a plane P4 (FIGS. 1 and 2) containing both the transverse direction T and the normal N. It will be noted that the light beam from the transmitter 4 diverges in order to illuminate the area 10. A lens 14, having a skewed optic axis, focuses approximately half the area 10, indicated at 10', on to the receiver 6. A lens 15, also having a skewed optic axis, focuses the other half of the area 10, indicated at 10", on to the receiver 7. The arrangement is symmetrical about the optic axis 16 of the transmitter 4.

Accordingly, a single transmitter 4 is used to illuminate the areas sensed by two separate receivers 6, 7, thus reducing the number of transmitters required. Furthermore, because the light diverges in the planes P2, P4 containing the transverse direction T, but not in the plane P3 containing the scanning direction S, a relatively large area can be illuminated while still avoiding the sensing of direct reflection by the receivers 6, 7. The light from the transmitter 4 incident on the banknote and the light from the banknote to the receivers 6, 7 travel in opposite directions in substantially the same path, the small path difference being as a result of the fact that the physical sizes of the transmitter and receivers cause a small angle to be subtended between the light paths at the banknote.

Figure 4:
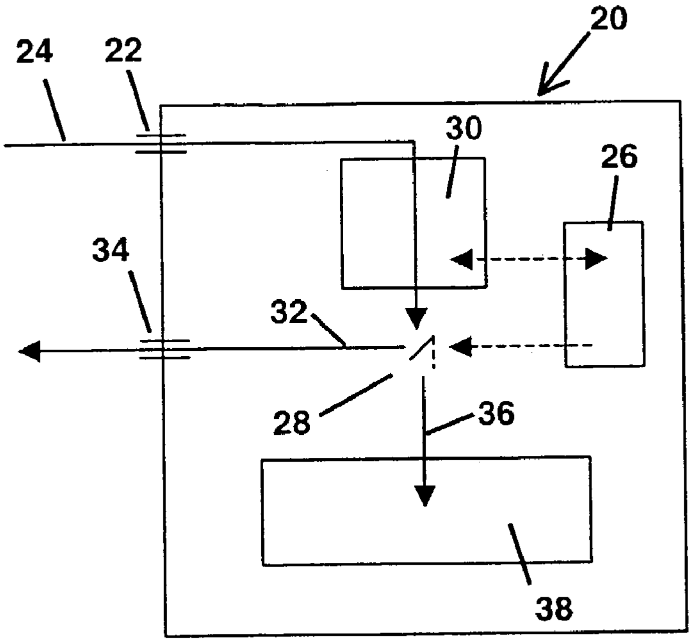
FIG. 4 is a diagram of a banknote validator in accordance with the invention.

FIG. 4 illustrates a banknote validator 20 in accordance with the invention. The validator has an inlet 22 arranged to receive banknotes which travel along a path 24 to an apparatus 30 which is arranged to test the optical transmission and reflectance characteristics of the banknote. A control means 26 is arranged to send signals to and receive signals from the apparatus 30 and to use the received signals to determine the authenticity and the denomination of the banknote. The control means 26 is also arranged to send control signals to the apparatus 30 to perform a calibration operation, as will be described below. The banknote travels from the apparatus 30 to a gate 28 which is controlled by the control means 26 in dependence upon the type of banknote received. The gate can direct the banknote either to a path 32 leading to an outlet 34, or to a path 36 leading to a banknote store 38.

Figure 5:
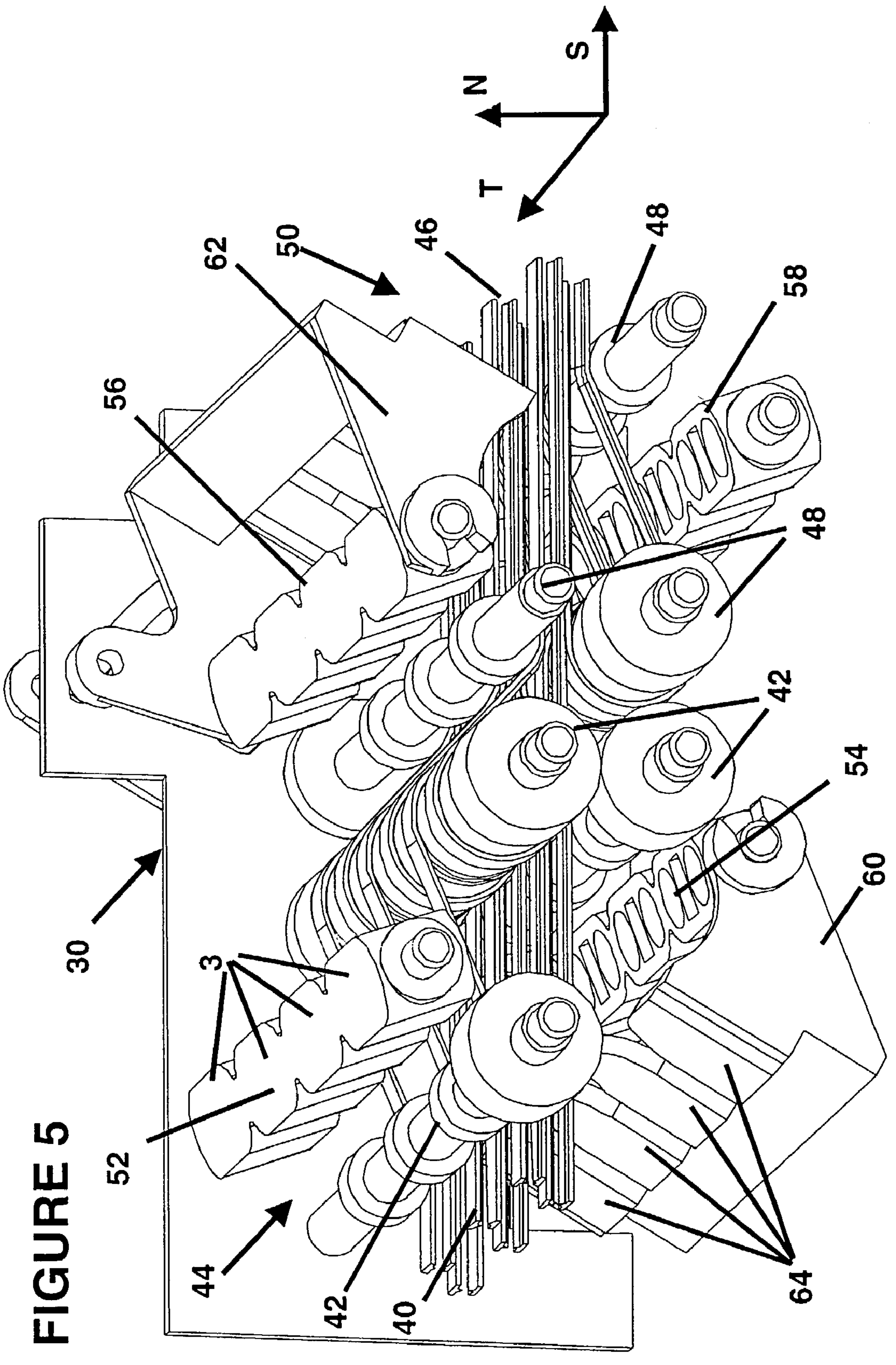
FIG. 5 is a perspective view of an apparatus for measuring transmittance and reflectance characteristics of a banknote, the apparatus forming part of the validator of FIG. 4.

The apparatus 30 for sensing the optical characteristics of banknotes is shown in more detail in the perspective view of FIG. 5. Banknotes are conveyed in the scanning direction S by means of endless belts 40 and sets of rollers 42 at the inlet side 44 of the apparatus and endless belts 46 and sets of rollers 48 at the outlet side 50 of the apparatus. The belts 40 and rollers 42 at the inlet side 44 of the apparatus are disposed laterally between the belts 46 and rollers 48 at the outlet side 50 of the apparatus.

The optical devices 3 (which are identical to the devices 3') are arranged in modules, or units. A first unit 52 is disposed above the banknote path at the inlet side 44, and faces a second unit 54 below the banknote path. Each unit comprises four optical devices 3 arranged in a line extending in the transverse direction T, each device comprising a transmitter 4 and a pair of receivers 6, 7 arranged as shown in FIGS. 2 and 3 to sense the reflectance and transmission characteristics in a pair of adjacent areas 10', 10" of the banknotes. The units 52 and 54 are arranged for sensing the reflectance and transmittance characteristics of the banknotes in scanned areas which extend between the inlet belts 40.

Figure 6:
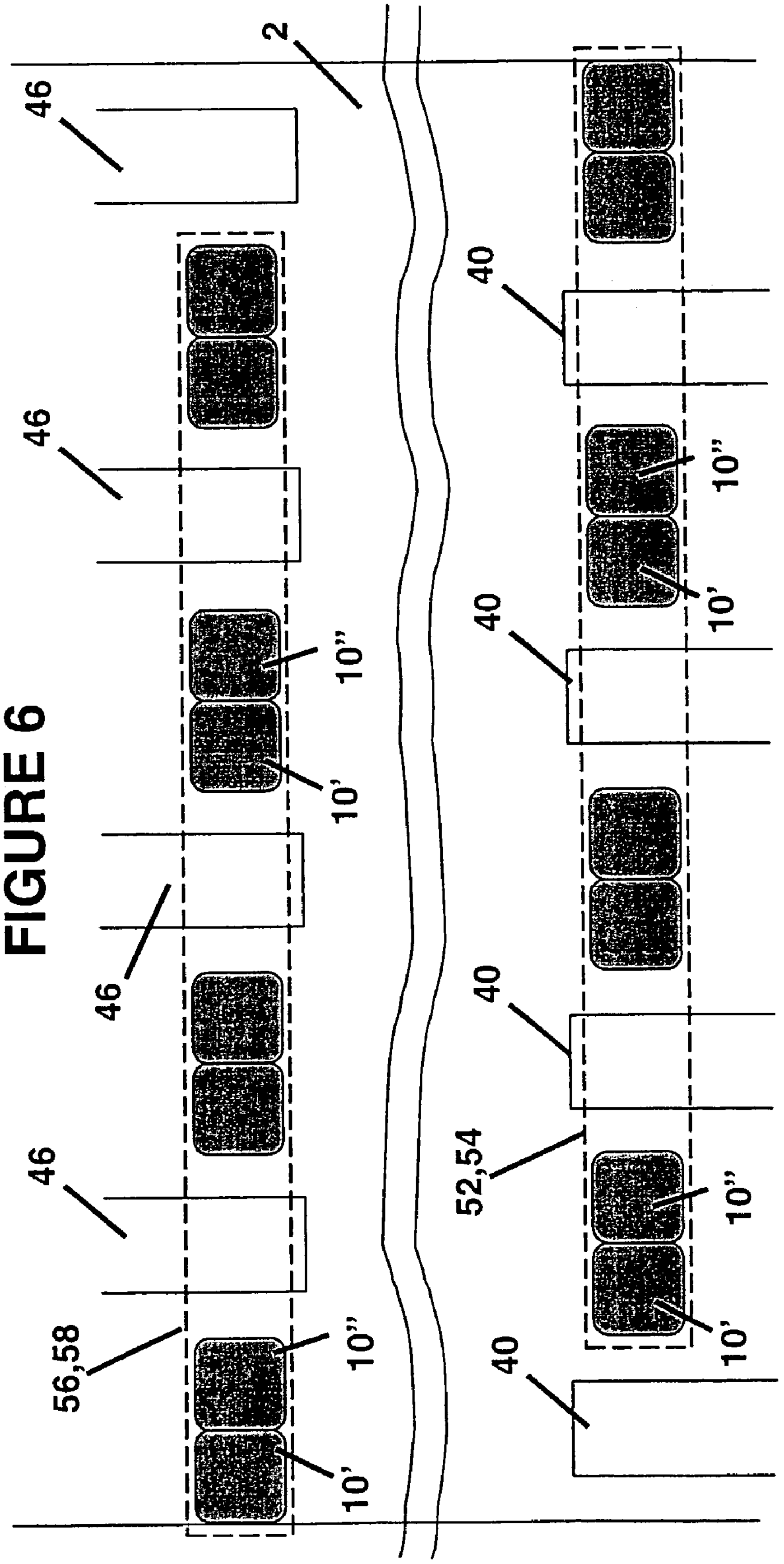
FIG. 6 is a plan view illustrating regions of a banknote which are scanned by the apparatus of FIG. 5.

Two further units, 56 and 58, are disposed respectively above and below the banknote path at the outlet side 50. These are of similar structure and orientation to the modules 52 and 54, except that they are arranged to scan the areas between the outlet belts 46. Accordingly, as indicated in the plan view of FIG. 6, the units 52, 54, 56 and 58 can scan the entire width of the banknote, each pair of units scanning areas between the areas scanned by the other pair.

It will be seen from FIG. 5 that the volume occupied by the units 52 to 58 can be relatively small, despite the fact that both transmittance and reflectance is measured right across the width the banknote. This is because (a) receivers are used for sensing both reflectance and transmittance characteristics, (b) each receiver is mounted in close proximity to the transmitter which emits the light which the receiver uses for sensing reflectance characteristics, (c) each transmitter illuminates sufficient area for two receivers, and (d) transmitters are used for both transmittance and reflectance measurements.

Within each of the devices 3, the transmitter 4 and the receivers 6 and 7 are mounted on a common circuit board. If desired, a single circuit board can be used for all the devices 3 within a single module.

In the preferred embodiment, each transmitter comprises an LED package which includes a plurality of dies each of a respective wavelength, for example red, green, blue and infra-red.

FIG. 5 also shows a pair of calibration units 60, 62. Each unit carries four reference bodies 64 and is mounted for pivotal movement about an axis parallel to the transverse direction T so that the body can be pivoted from a non-operational position, as shown in FIG. 5, to an operational position in which each reference body 64 is located between an optical device 3 of one of the units (52 or 56) and the corresponding optical device 3 in another of the units (54 or 58). In this position, the reference body is located in or near the banknote path, and is operable to transmit light from the transmitter 4 of one of the devices to the receivers 6,7 of the opposed device, and to reflect light from the transmitter 4 to its adjacent receivers 6,7. Each reference body has predetermined reflection and transmission characteristics, so that calibration of the apparatus can be performed by taking reflectance and transmission measurements while the reference members 60, 62 are in their operational positions.

The operation of the validator 20 of FIG. 4 is as follows. A received banknote is delivered to the inlet side 44 of the apparatus 30. The reference members 60, 62 are in their non-operational positions at this time. The control means 26 continuously checks the light transmitted between the optical units 52, 54 in the inlet section 44 until it detects the significant change caused by the leading edge of the banknote. Further movement of the banknote in the scanning direction S is tracked using an encoder so that the subsequent transmission and reflectance measurements can be associated with respective positions on the banknote.

As the banknote continues to travel between the units 52, 54, various transmission and reflectance measurements are taken in sequence under the control of the control means 26 which activates the respective dies of different wavelengths, and enables the respective receivers, according to a stored programme. Preferably, the arrangement is such that: (a) dies of different wavelengths are not energised at the same time, (b) reflectance measurements made by each receiver take place when the opposed transmitter on the other side of the banknote path is de-energised, and (c) transmission measurements made by each receiver take place when its adjacent transmitter is de-energised.

The measurements are initially carried out using the units 52, 54, but similar measurements are also carried out by the units 56, 58 when the leading edge of the banknote has reached these units, as determined by the output of the encoder.

After the banknote has left the apparatus 30, the control means 26 moves the reference members 60, 62 to their operational positions and takes both transmission and reflection calibration measurements which are used to adjust the power supply to the dies of respective wavelengths so that the intensities of the outputs as measured by the receivers complies with a predetermined level, adjust the sensitivities of the receivers and/or alter the processing of the receiver outputs to achieve calibration of the apparatus.

Instead of performing the calibration each time a banknote has passed through the apparatus 30, the calibration operation may be performed only at the end of the transaction which may involve the measurement of one or more banknotes.

Various modifications of the described arrangements are possible. For example, the reference members 60, 62 could be replaced by a sheet, made of for example plastics material, with predetermined reflection and/or transmission characteristics. This sheet could be fed along the banknote path, using the normal banknote feeding mechanism, and stored within the banknote apparatus, for example using a dedicated sheet store, so that the reference sheet can be discharged from the store to perform a calibration operation and then returned to the store.

A cleaning means such as a brush may be provided so that each reference body or the reference sheet is cleaned as it is moved to or from the position in which calibration takes place.

As explained above, it is important to use diffuse (i.e. not directly) reflected light so that a reliable measurement of the banknote's spectral characteristics can be obtained. However, and in accordance with a preferred aspect of this invention, it has been found that valuable information can be obtained by measuring direct (i.e. specular) reflection in addition to diffuse reflection. Furthermore, arrangements according to the present invention have a geometrical structure which relies upon light paths for transmissive and reflective measurements which avoid the path taken by direct light reflection. Accordingly, it is particularly simple to provide such structures with the means for additionally detecting directly-reflected light.

This can be appreciated by referring again to FIG. 1. It is easy to place an additional sensor 9 in the path 8 of the directly-reflected light, and this is all that is required to obtain the additional measurement; the light is provided by the same transmitter 4 as is used for diffuse-reflection and transmission measurements. A further sensor could be placed below the banknote path to detect directly-reflected light from the transmitter 4'.

Figure 7:
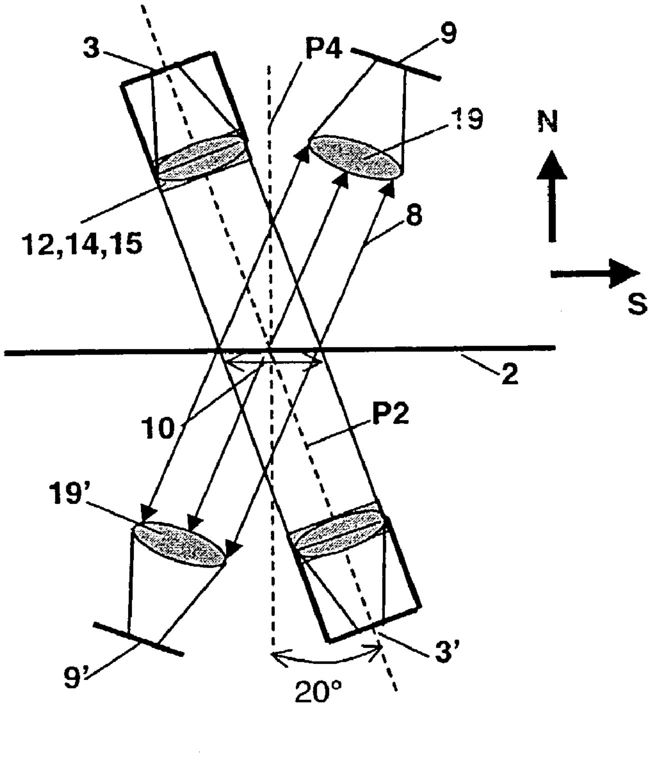
FIG. 7 is a schematic side view showing the operation of a modified embodiment of the invention.

A modified embodiment could therefore be constructed as shown in FIG. 7. This is similar to FIG. 2, except for the provision of additional sensors 9, 9' and focussing lenses 19, 19' for focussing directly-reflected light onto these sensors.

By additionally measuring directly-reflected light, it is possible to sense the state of the surface of the banknote. This could be useful for detecting, for example, shiny areas caused by metal strips incorporated into the banknote or by adhesive tape on the banknote. Additionally, or alternatively, the paper quality or texture could be sensed, for example to test the fitness of the banknote to determine whether it should be dispensed. The directly-reflected light could also, or alternatively, be used (possibly in combination with a diffuse-reflection measurement) to distinguish between intaglio-printed ink and ink of uniform thickness. The provision of sensors for detecting reflected light at different angles (i.e. the diffuse-reflectivity sensors 6,7 and the direct-reflectivity sensor 9) could also be useful in detecting optically-variable ink.

Figure 8:
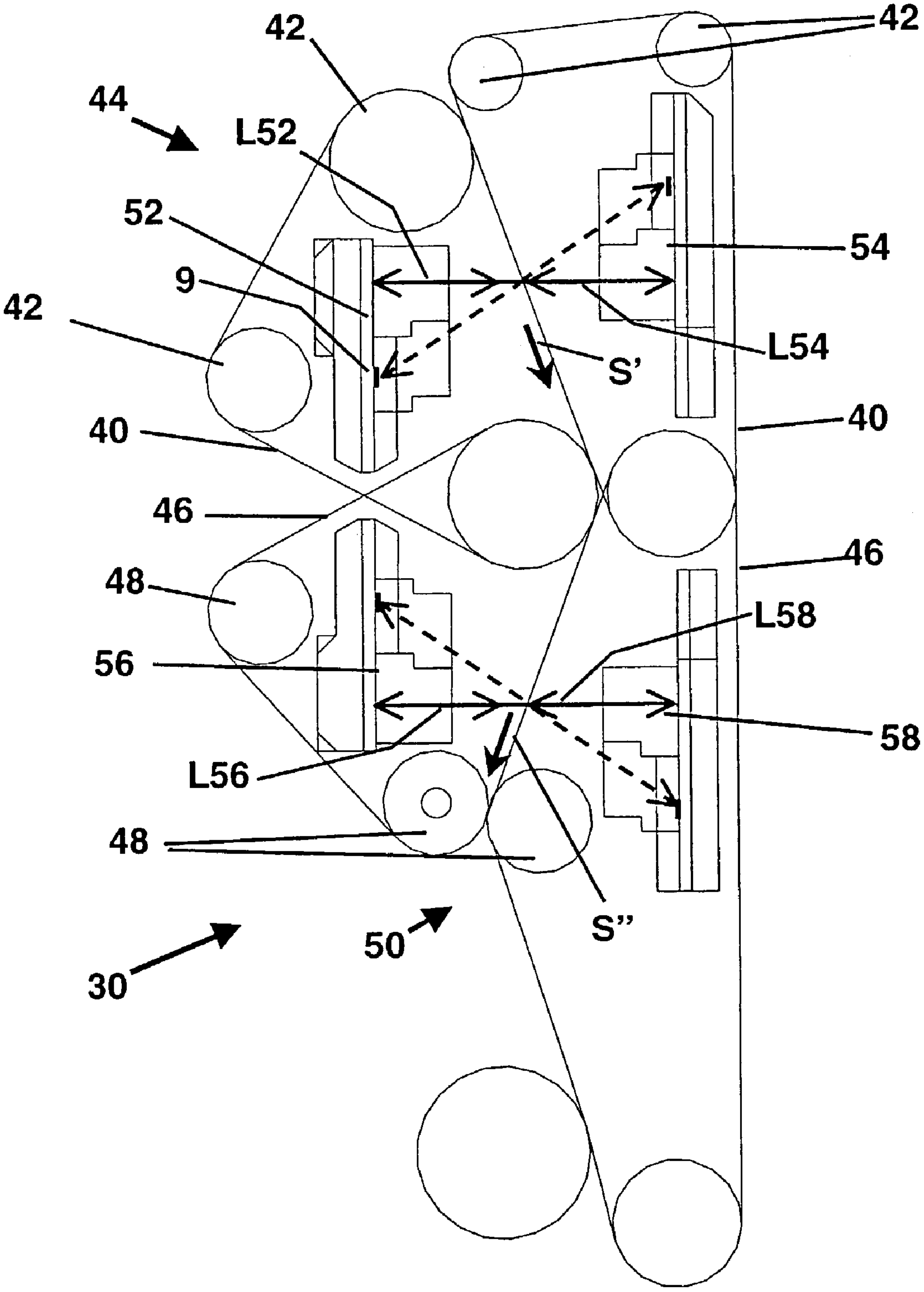
FIG. 8 is a side view of a further embodiment of the invention.

FIG. 8 shows another embodiment of the invention, similar to FIG. 5. The features described with respect to FIG. 5 also apply to the embodiment of FIG. 8, and like reference numbers represent like parts, except as indicated below.

The embodiment of FIG. 8 is shown in a different orientation from that of FIG. 5, incorporates sensors for receiving directly-reflected light and additionally has a modified structure as compared with the arrangement of FIG. 5 in order to make it more compact and easier to assemble.

In FIG. 5, the transmiters of the optical units 52 and 56 above the banknote path produce light paths which form an obtuse angle with respect to the direction of movement of the banknote; the transmitters of units 54 and 58 produce light paths which form an acute angle with respect to this direction. On the contrary, in FIG. 8, the banknote path is bent and the angles formed by the light paths of the transmitters at the input side are opposite to the angles formed by the corresponding light paths at the output side. Thus, the transmitters of unit 52 on the left of the path at the inlet side produce light paths L52 which form an obtuse angle with respect to the direction S' of movement of the banknote, whereas the transmitters of the left unit 56 at the outlet produce light paths L56 which form an acute angle with respect to the direction S" of movement. Correspondingly, at the right side, the inlet unit 54 uses light paths L54 which are acute with respect to direction S' and the outlet unit 58 uses light paths L58 which are obtuse with respect to direction S".

The consequence of this is that all the units are mounted parallel to each other, with the upper units 52, 56 co-planar and the lower units 54, 58 also co-planar. This provides a more compact and conveniently assembled structure.

The direct-reflection light paths are shown in broken lines, with one of the direct-reflection sensors being shown at 9.

The arrangements described above all allow for particularly compact arrangements which scans the entire width of the banknote. However, other arrangements are possible. For example, the scanning direction could be different; in an alternative embodiment, banknotes are scanned in the direction T shown in FIGS. 1, 3 and 5, instead of the direction S. This might be appropriate if the banknote is to be scanned only along discrete tracks extending in the scanning direction, rather than completely across the banknote. In such an arrangement, it is less advantageous to have the light diverge in the plane containing the direction T.

The invention claimed is:

1. Apparatus for sensing optical characteristics of a banknote, the apparatus comprising at least a first optical transmitter (4) located on one side of a path along which a banknote (2) can be moved in a scanning direction (S) in the plane (P1) of the banknote for illuminating the banknote (2), and at least a first optical receiver (6;7) for receiving light diffusely reflected from the banknote, the first transmitter (4) being arranged to transmit light in a direction which is inclined with respect to the normal (N) to the plane (P1) of the banknote (2) and the first receiver (6;7) being arranged to receive light which is traveling in substantially the same path but the opposite direction from the light emitted by the transmitter (4) from a frame of reference in which the apparatus is viewed in a plane (P3) containing the scanning direction (S) and the normal (N) to the plane (P1) of the banknote (2).

2. Apparatus as claimed in claim 1 comprising a second optical transmitter (4') on the other side of the banknote path to the first optical transmitter (6), the first receiver (6;7) being arranged to sense light transmitted via the banknote (2) from the second transmitter (4').

3. Apparatus as claimed in claim 1, including a second optical receiver (6';7') arranged to sense light transmitted from the second transmitter (4') and diffusely reflected by the banknote (2).

4. Apparatus as claimed in claim 3, the second receiver (6';7') being arranged to sense light transmitted via the banknote (2) from the first transmitter (4).

5. Apparatus as claimed in any preceding claim, wherein the first transmitter (4) is arranged to transmit light in a direction which is inclined with respect to the normal (N) to the plane (P1) of the banknote (2) when viewed in a plane (P3) containing the scanning direction (S) and the normal (N) to the plane (P1) of the banknote (2).

6. Apparatus as claimed in claim 1, arranged such that the light sensed by the first receiver (6;7) travels in a sensing plane (P2) which contains a direction (T) that is substantially perpendicular to both the scanning direction (S) and the normal (N) to the plane (P1) of the banknote (2).

7. Apparatus as claimed in claim 6, arranged such that the light transmitted by the first transmitter (4) also travels in said sensing plane (P2).

8. Apparatus as claimed in claim 7, wherein the light from the first transmitter (4) diverges when viewed in said sensing plane (P2) as it travels to the banknote, so as to illuminate an area which is elongate and extends in a direction (T) traverse to the scanning direction (S).

9. Apparatus as claimed in claim 8, including first and second light receivers (6,7) both located on said one side of the path, each light receiver (6,7) being arranged to receive light from the first transmitter (4) which has been diffusely reflected by an area (10',10'') of the banknote, the areas (10',10'') from which the first and second receivers (6,7) receive light being displaced in a direction (T) transverse to the scanning direction (S).

10. Apparatus as claimed in claim 7 including collimating means for preventing the light from the first transmitter (4) from diverging when viewed in a plane (P3) containing the scanning direction (S) and the normal (N) to the plane (P1) of the banknote (2).

11. Apparatus as claimed in claim 2 or claim 1, including a further optical receiver (9) arranged to sense light transmitted from the first transmitter (4) and specularly reflected by the banknote (2).

12. Apparatus as claimed in claim 2 or claim 1, wherein the first transmitter and the first receiver are mounted on a common circuit board.

13. Apparatus as claimed in claim 2 or claim 1, including a set of devices (3) each comprising a respective first receiver (6;7) and a respective first transmitter (4), each device (3) thereby being arranged to scan a respective area of one side of the banknote (2), the areas being displaced from each other in direction (T) transverse to the scanning direction (S).

14. Apparatus as claimed in claim 13, including a further set of devices for scanning areas of said one side, each of which areas is located between areas scanned by the first set of devices.

15. Apparatus as claimed in claim 14, wherein the respective sets of devices are disposed in succession along a banknote path, one set of devices being adjacent a first part of the banknote path and defining a light path to the banknote at a first angle with respect to the direction of movement of the banknote and the other set of devices being adjacent a second part of the banknote path and defining a light path to the banknote at a second angle with respect to said direction of movement, the first and second banknote path parts being inclined with respect to each other, one of the first and second angles being acute and the other of the first and second angles being obtuse.

16. Apparatus as claimed in claim 13, including a further set of devices for scanning areas of the opposite side of the banknote.

* * * * *